United States Patent
Wong et al.

(10) Patent No.: US 7,523,143 B2
(45) Date of Patent: Apr. 21, 2009

(54) MAPPING SOURCE LOGICAL CLOCK INTO DESTINATION LOGICAL CLOCK IN A DISTRIBUTED SYSTEM

(75) Inventors: Lik Wong, Union City, CA (US); Edwina Lu, Palo Alto, CA (US); James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 334 days.

(21) Appl. No.: 10/909,985

(22) Filed: Aug. 2, 2004

(65) Prior Publication Data

US 2005/0256861 A1    Nov. 17, 2005

Related U.S. Application Data

(60) Provisional application No. 60/570,540, filed on May 12, 2004.

(51) Int. Cl.
  *G07F 17/30*   (2006.01)
  *G06F 15/16*   (2006.01)
(52) U.S. Cl. ...................... 707/202; 707/204
(58) Field of Classification Search ............... 707/202, 707/204
See application file for complete search history.

(56) References Cited

U.S. PATENT DOCUMENTS 6,304,882 B1 * 10/2001 Strellis et al. ............... 707/202
6,401,239 B1 *  6/2002 Miron ........................ 707/203

* cited by examiner

*Primary Examiner*—Shahid A Alam
*Assistant Examiner*—Alex Gofman
(74) *Attorney, Agent, or Firm*—Hickman Palermo Truong & Becker LLP

(57) ABSTRACT

A source database system sends information to a destination database system, and each database system generates a separate set of sequence information. A mapping is maintained between the two sets of sequence information. Using the mapping, the destination database system may be used to restore changes lost at the source database system without reinstating the source database. Additionally, queries associated with a particular point in a sequence associated with the sequence information of the source database may be redirected to the destination database, and the destination database system may serve as a logical standby for the source database system. A variety of methods of maintaining and/or extracting the mapping information are disclosed.

36 Claims, 2 Drawing Sheets

MAPPING SOURCE LOGICAL CLOCK INTO DESTINATION LOGICAL CLOCK IN A DISTRIBUTED SYSTEM

CROSS REFERENCE TO RELATED APPLICATIONS; PRIORITY CLAIM

This application claims benefit of Provisional Appln. 60/570,540, filed May 12, 2004, the entire contents of which is hereby incorporated by reference as if fully set forth herein, under 35 U.S.C. §119(e).

FIELD OF THE INVENTION

The invention relates in general to sending data between computers. The invention also relates to synchronizing data of a computer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, unless otherwise indicated, it should not be assumed that a problem has been recognized by the prior art merely because the problem is discussed in this section.

An N-way distributed system refers to a set of computer systems, which may be a database system or file-based computer, where each computer shares information with all of the other computer systems via data streams transmitted over one or more network connections. A "source" computer may transmit a data stream to a "destination" computer, for example, to replicate changes, which occurred within the source database, from the source database to the destination database. Each of the source and the destination computers independently maintains its own sequence of SEQs, an ordered set of monotonically increasing values associated with events that indicate the order of events relative to each other. The SEQs serve as the logical clock of a computer system. A well-known algorithm for imposing a partial order on events in a distributed system is a Lamport Clock.

However, there is no easy way to synchronize the SEQ of a source computer (which produces a data stream) to the SEQ of a destination computer, which "consumes" or applies the data stream. Consequently, after a crash of the source computer, to recover the source computer from data at the destination computer, the SEQs are not very useful in narrowing the time period associated with the destination database system or in otherwise reducing the time required for performing a point in time recovery from the data at the destination computer. Additionally, there may be a varying lag between the application of changes at the source database system and at the destination database system. Consequently, the SEQs of the destination database system and time stamps are also not adequate for determining a time period at the destination database system associated with the loss of data at the source database system. As a result, inefficient ways of performing point in time recovery are resorted to, such as to re-instantiate the source database system or to do a complete recovery, which is very expensive in terms of time and resources. At times, a complete recovery may not even be possible.

In view of the above, there is a need for a method of performing a point in time recovery that uses less resources and/or time to recover from data at another database system.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
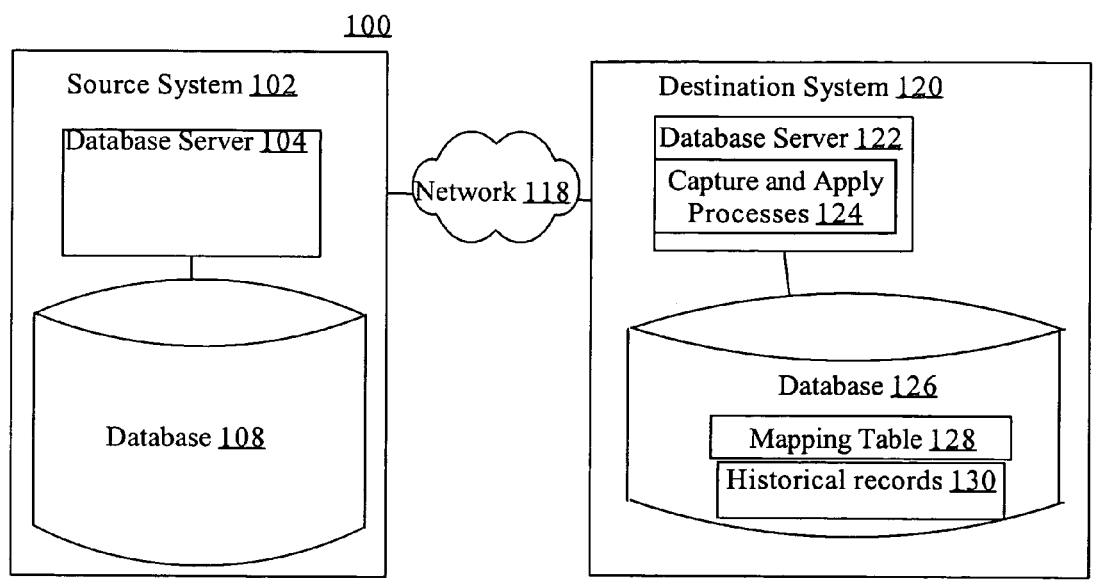
FIG. 1 is a block diagram of an example of a system for implementing an embodiment of the present invention.

A method and apparatus for synchronizing sequence information of two systems is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Functional Overview

A source database system and destination database system each maintain separate and independent SEQs, which are generated in a manner such that the values of the two SEQs are initially (as generated) unrelated to one another and uncorrelated with one another. In an embodiment, the SEQs may be System Change Numbers, as described in Oracle 8 server Concepts, Release 8.0, Volumes 1 and 2 (Part Numbers A54644-01 and A5446-01). The source database system may be any system that maintains files, such as a database. The destination database system may be any system that applies (e.g., consumes) the data sent by the source database system. Let SRC_SEQ represent the SEQ at the source database system, and DEST_SEQ represent the corresponding SEQ at the destination database system. A mapping is maintained between SEQs of the source database system (the SRC_SEQs) and SEQs of the destination database system (the DEST_SEQs). As a result of the mapping, queries sent to the source database system may be redirected to the destination database system (which may be a logical standby database system for example), and return results that are consistent with the state of the source database system at a particular point in time. Keeping a mapping between the two sets of SEQs facilitates using copies of changes sent to a destination database system to recover all or part of the data that was later lost at the source database system, without reinstating the entire source database system or doing a complete recovery. Additionally, queries involving a join between columns in tables on different database systems may be performed in a manner such that the data being joined is consistent at a given point in time. Although in the description that follows specific examples are given in which it is useful to correlate the source SEQs of changes applied at the source database system and destination SEQs of changes applied at the destination database system at a specific point in time or over a specific time period, the disclosure is not limited to these specific examples. The scope of the disclosure also includes any other situations in which correlating specific destination SEQs and source SEQs at a particular time or over a particular time period is useful.

Flashback Query Redirection

Consider a setup including a source database system and a destination database system, in which the destination database system functions as a backup or logical standby database system for the source database system. Consequently, changes at the source database system are sent to the destination database system. Assume that the user wants to do a series of intensive queries (perhaps for a report, for example) at the source database system that are related to a particular time (for example, the last time for a quarter), but the user does not want to impact the performance of the source database system. In a flashback query, the results of the query that are returned are consistent as of a particular point in time, which, in an embodiment, the user may specify. The user may perform a flashback query by obtaining the source SEQ for the source database system at the specified point of time. This source SEQ may be referred to as SRC_FB_SEQ. SRC_FB_SEQ may be mapped to the corresponding destination SEQ at the destination database system (e.g., a backup or logical standby database). The SEQ at the destination database system corresponding to SRC_FB_SEQ may be referred to as DEST_FB_SEQ. Queries for information stored on the source database system at SRC_FB_SEQ may be submitted to the destination database system (e.g., a backup or logical standby database) at DEST_FB_SEQ.

Groupings

Changes to the source database system are represented by one data piece or groups of multiple data pieces. Each change and/or data piece may correspond to, for example, the insertion of one or more new records, a deletion of existing records, or the update of one or more existing records. For a group of data pieces, each data piece can be associated with its own SEQ. The group is applied atomically, that is, all changes by the group of data pieces corresponds to a transaction, and the applying of the group corresponds to committing the transaction. The individual changes in a group are not visible to others until after all of the changes associated with a group have been made. In database systems, groups of data that are applied atomically are often referred to as transactions. The committing of a transaction refers to making all its changes permanent. A transaction includes a set of changes, and each change corresponds to a data piece of a group. Similar to data pieces in a group, each change of a transaction may be associated with an SEQ that is different than another SEQ associated with another change in the transaction. When a group is referred to herein as being applied, the group is applied atomically.

Since each group is also applied atomically at the destination and source database systems, each group may be associated with an SEQ at the source database system and a corresponding SEQ at the destination database system. In an embodiment, each group of data pieces is identified by a group SEQ, which may be referred to as, or associated with, a transaction identification. Identifying a group with a group SEQ facilitates matching each of the changes in the group with the SEQ at the source database system at the time that the changes were performed. For each change in a group, the group SEQ may be in addition to or instead of an individual SEQ of a data piece. In an embodiment, the individual SEQ of the last piece of the group may be used as the group SEQ. After the last piece of data in the group is committed (which in this embodiment, has the group SEQ as its individual SEQ), the data is visible. In general, anywhere in this specification where SEQs are discussed, group SEQs may be substituted for the individual SEQs to obtain another embodiment of the invention.

Out of Order Application

In some systems, groups or other data pieces may be applied "out of order", that is in an order that is different than they were applied at the source database system. As a result of out of order application, the destination database system may be in states that were never present at the source database system. In an embodiment, if out of order application is allowed, then synchronization points may be used. Synchronization points are points at which both the source database system and the destination database system have the same state. For example, at a destination SEQ of a synchronization point, all of the changes applied to the source database system at a corresponding source SEQ have also been applied to the destination database system. Synchronization points are discussed in U.S. patent application Ser. No. 10/260,574, entitled, "Method of Applying Change to a Standby Method", filed Oct. 1, 2002, which is incorporated herein by reference. Flashback queries can be executed at the synchronization points by storing a mapping correlating the SRC_SEQs of the source database system with the DEST_SEQs of the destination database system that are associated with synchronization points. When a query is submitted to the destination database system referencing a source SEQ of a synchronization point, the mapping is used to determine the destination SEQ of the corresponding synchronization point at the destination database system, and results for the query are returned by the destination database system based on the destination SEQ of the synchronization point.

Algorithm for Mapping Source SEQs to Destination SEQs

When the destination database system applies a group or a data piece from the source database system, the source SEQs are recorded at the destination database system in a table with the corresponding destination SEQs, for example. The list of recorded source SEQs with their corresponding destination SEQs may be referred to as the mapping table. In an embodiment, the mapping table may be an infinite list (e.g., in a file without a fixed end). In an embodiment, old rows may be purged periodically, but then the mapping information may be lost for the purged pairs of source and destination SEQs. In an embodiment, to find the destination SEQ for a particular time, the mapping table may be queried to find the record with the largest source SEQ value that is less than or equal to SRC_FB_SEQ, and the value found for the destination SEQ listed in the mapping as corresponding to the source SEQ is the DEST_FB_SEQ corresponding to SRC_FB_SEQ. For example, consider the following mapping table.

TABLE 1

| SRC_SEQ | DEST_SEQ | Changes |
|---------|----------|---------|
| S0 | D30 | I |
| S1 | D44 | E |
| S12 | D45 | C |
| S33 | D65 | D |
| S41 | D144 | H |
| S42 | D148 | A |
| S47 | D165 | B |

In the above table the column labeled DEST_SEQ lists destination SEQs, the column labeled SRC_SEQ lists source SEQs, and the column labeled "Changes" lists labels for changes to the database system. In TABLE 1 and in all of tables discussed in this specification, although the rows are listed sequentially, the rows may be located in any order in the table. In TABLE 1 and in all of tables discussed in this specification, the column "Changes", listing labels for the changes, is not required. The "changes" (to the database) refers to operations performed initially on the source database system or changes in data of the source database system, which are later applied to the destination database system. If SRC_FB_SEQ is S4, then S1 is the largest source SEQ that is less than or equal to the SRC_FB_SEQ. When SRC_SEQ equals S1, DEST_SEQ equals D44, and consequently, DEST_FB_SEQ is D44 in this embodiment.

Searches or other database operations may be performed on the mapping table using database commands, such as a SELECT statement, associated with a database language, such as Structured Query Language (SQL). A variety of methods may be used for scanning the mapping table, and obtaining a particular source SEQ or destination SEQ value. For example, when searching for a particular value of a source SEQ or destination SEQ, if the source SEQ or destination SEQ, respectively, are listed in the mapping table in a sequential manner, the mapping table may be searched sequentially, one record at a time; otherwise, a binary search may be used. In an embodiment, time stamps of the destination database system and/or source database system may be included in the mapping table. Additionally or alternatively, a precise or approximate correlation between time and source SEQs and/or destination SEQs may be maintained, which may be used to shorten the search for a particular source SEQ and/or destination SEQ.

Approximate Destination SEQ

In an embodiment, the destination SEQ in the mapping table may be an approximate value. If the destination SEQ is an approximate value, then a historical record (e.g., a redo and/or undo log) is scanned to find the exact SEQ value for the change associated with the recorded destination SEQ, and the exact SEQ found in the log is the DEST_FB_SEQ. Each historical record in a historical log may reflect a change made to a database system and/or a data piece entered into or changed in a database system. The historical record may also store an SEQ associated with the change and/or data piece. In an embodiment, Oracle's Logminer may be used for scanning the historical records. In an embodiment, when the DEST_FB_SEQ found in the mapping table is approximate, the approximate DEST_FB_SEQ is a lower bound on the precise DEST_FB_SEQ. In an embodiment the historical record may include a transaction identifier or other identifier to facilitate finding the precise DEST_FB_SEQ. In general, throughout this specification, although as a convenience this specification often refers to finding a destination SEQ from the mapping table, as if the destination SEQ is the exact value needed, it should be understood that the destination SEQ of the mapping table may be an approximate destination SEQ, and that a historical record may need to be searched for the actual exact destination SEQ. In general, similar to the mapping table, a variety of methods may be used for scanning the historical records, and obtaining a particular source SEQ or destination SEQ value. For example, if changes are applied in the order received and the source SEQs are added to the mapping table in a sequential manner, then the destination SEQs will be added to the historical record in a sequential order. Consequently, if the changes are applied in order, the historical record may be searched sequentially, one record at a time, or a binary search may be used for finding a particular source SEQ.

Alternative Algorithm for Mapping a Source SEQ to a Destination SEQ

In another embodiment, only one row having a correspondence between a source SEQ and a destination SEQ is stored in the mapping table. The row of the mapping table is updated each time a data piece or group is applied. Each time the row of the table is updated, the change is entered in a historical record (e.g., a redo or undo log). When the value of a source SEQ that corresponds to a particular destination SEQ is desired, for example, the historical records are scanned to find an old entry to the mapping table that gives the source SEQ for the corresponding destination SEQ. Thus, for the series of changes listed above in TABLE 1, at DEST_SEQ D45, the entire mapping table is

| S12 | D45 | C |
|-----|-----|---|

At DEST_SEQ D48, the entire mapping table is still

| S12 | D45 | C |
|-----|-----|---|

The mapping table remains unchanged until DEST_SEQ D65 at which time the mapping table is updated, and becomes

| S33 | D65 | D |
|-----|-----|---|

In this embodiment, given a particular SRC_FB_SEQ, one manner of finding the corresponding DEST_FB_SEQ is to flashback (e.g., inspect the historical record) for the mapping table, until the greatest source SEQ is found that is less than or equal to SRC_FB_SEQ. The destination SEQ recorded in the historical record that maps to the greatest source SEQ (that is less than or equal to SRC_FB_SEQ) that is found is the DEST_FB_SEQ.

Point in Time Recovery

If the source SEQ in the mapping table is monotonically increasing (e.g., if the destination database system applies the data in the same order that the source database system applies the data), then it is possible to search either the mapping table or historical record efficiently. To facilitate finding the changes lost at the source database system within the historical records of the destination database system, it may be desirable to have a mechanism for distinguishing changes that originated at the source database system from other changes performed at the destination database system (such as changes originating from the destination database system or another system other than the source database system). For example, a marker, a tag, or other indicator of the system from which the change originated may be recorded in a manner that the indicator is associated with the historical record.

Assume that there are two systems in which the source database system sends changes to a destination database system. If the source database system crashes (or loses data for other reasons) at time T2, the source database system recovers to an earlier point in time, which will be referred to as T1 (where T1 is earlier or less than T2), because at time T2 there may have been one or more transactions that finished between times T1 and T2. In general, it may be desirable to choose a range of destination SEQs, starting with a first destination SEQ and ending with a second destination SEQ, that includes all changes or a superset of all changes that occurred at the source database within the time period T1 to T2, and filter out those changes that have source SEQs that correspond to times that are not within the time period T1 to T2. There are a variety of SEQs that may be useful in determining the changes associated with the time period between T1 and T2 that need to be recovered.

The Source SEQ Marking the Beginning of a Time Period, T1 (SRC_PITR_SEQ)

Using the above example in TABLE 1, assume that SRC_SEQ is S10 at T1 and is S48 at T2. The SEQ for T1 will be referred to as SRC_PITR_SEQ. Consequently, SRC_PITR_SEQ is S10. Changes (affecting either single data pieces or groups of data pieces) that were performed at a source SEQ that occurred between T1 and T2 are now lost. Thus, in the above example, S12, S33, S41, S42, and S47 are now lost. The changes that occurred between T1 and T2 have source SEQs that are greater than SRC_PITR_SEQ (e.g., S12, S33, S41, S42, and S47 are greater than S10), and a source SEQ to destination SEQ mapping can be used to help recover a subset or all of the changes between T1 and T2, which were lost. The changes lost at the source database system have been applied at the destination database system, and it is therefore possible to mine the historical records (e.g., the redo log) at the destination database system for the lost changes. When mining for the lost changes, SRC_PITR_SEQ may be used to filter out changes that are within the range of destination SEQs being searched for but that have source SEQs that correspond to times that are prior to T1. After all or a subset of the lost changes have been recovered from the redo log of the destination database system, the recovered changes may be sent back to the source database system and applied.

The Last Destination SEQ that Needs to be Included in a Search (DEST_MAX_SEQ)

DEST_MAX_SEQ is a destination SEQ at which it is safe to stop searching the destination database system's historical record (e.g., redo log) or mapping table for changes that need to be recovered by the source database system. The last entry added to the mapping table may be used for DEST_MAX_SEQ. Alternatively, DEST_MAX_SEQ is a destination SEQ at or after the destination database system has finished applying all of the changes lost by the source database system. Thus, when searching the mapping table or historical records of the destination database system for the range of destination SEQs that include the changes lost at the source database system, DEST_MAX_SEQ marks the last destination SEQ that needs to be searched for. Any of a variety of values may be chosen for DEST_MAX_SEQ as long as DEST_MAX_SEQ is a destination SEQ that is greater than or equal to the maximum destination SEQ in the mapping table.

The Point where to Start Searching a Historical Record (DEST_START_SEQ)

In capturing the lost data from historical records, it may be useful to determine the destination SEQ indicating where to start looking in the destination database system's redo log, which may be referred to as DEST_START_SEQ. A similar value may be defined for other types of historical records.

As mentioned previously, data pieces within a group may each be associated with an SEQ that is different from and/or less than the group's SEQ. Thus, a group can be associated with a range of SEQs. The range represents the duration of the group. The group's SEQ is the end of the duration. The earliest SEQ associated with any data piece of the group is the duration's beginning, and referred to herein as the group's starting SEQ. For the purposes of point in time recovery, it may be desirable to take into account the starting SEQ of the group. The specification often refers to starting and finishing to apply a change or piece of data; however, in an embodiment, the start of the application of a change and/or piece of data refers to making a first change of a group of changes that has not yet committed and that is associated with the application of the change and/or piece of data. Similarly, finishing the application refers to committing all of the changes of a group of changes associated with the application of the change and/or piece of data.

DEST_START_SEQ is a destination SEQ that is earlier than or equal to the starting SEQ of any group that needs to be recovered for the source database system or that was lost at the source database system. Stated differently, in an embodiment, the DEST_START_SEQ is the earliest starting SEQ that corresponds to a group source SEQ that is greater than SRC_PITR_SEQ.

In the above example, the lost changes all have source SEQs that are greater than SRC_PITR_SEQ, and therefore should have source SEQs that are greater than S10. The smallest SRC_SEQ that is greater than S10 is S12. Thus, all the lost groups have source SEQs that are greater than or equal to S12. The DEST_SEQ that maps to S12 is D45. Consequently, in this example, the DEST_START_SEQ must be less than D45. For example, assume that the starting destination SEQs that are associated with the changes of TABLE 1 are listed in the column, "Starting DEST_SEQ" of TABLE 2, below.

TABLE 2

| SRC_SEQ | DEST_SEQ | Starting DEST_SEQ | Changes |
|---------|----------|-------------------|---------|
| S0      | D30      | D29               | I       |
| S1      | D44      | D35               | E       |
| S12     | D45      | D7                | C       |
| S33     | D65      | D40               | D       |
| S41     | D144     | D1                | H       |
| S42     | D148     | D23               | A       |
| S47     | D165     | D150              | B       |

The starting destination SEQs that have source SEQs that are greater than S10 are D1, D7, D23, D40, and D150. The smallest of the starting destination SEQ is D1, and consequently DEST_START_SEQ is D1.

In an embodiment, redo logs at the destination database system store the destination SEQs for changes, so that given the DEST_START_SEQ and DEST_MAX_SEQ, it is possible to know which changes should be captured from the redo log, even if the destination database system applies changes out of order. In other words, changes that have destination SEQs between DEST_START_SEQ and DEST_MAX_SEQ, and that have source SEQs that are greater than SRC_PITR_SEQ are captured from the historical records of the destination database system, and applied at the source database system. In an embodiment, changes that were lost at the source database system may be recovered from the destination database system and selectively applied to the source database system. In an embodiment, a table may be used for finding DEST_START_SEQ, and then DEST_START_SEQ may be used to determine the relevant parts of a redo record. In an embodiment, DEST_START_SEQ may be found from and used to determine relevant sections of a table. In an embodiment, DEST_START_SEQ may be found from and used to determine relevant sections of a historical record. In general, any of the special destination and source SEQs (e.g., DEST_START_SEQ) discussed in this specification may be found by searching a table and then, once found, may be used to find information in the same or a different table or a historical log. Similarly, any of the special destination and source SEQs discussed in this specification may be found by searching a historical log and then, once found, may be used to find information in the same or a different historical log or in a table.

The Destination SEQ Prior to the Application of any Source SEQs that are after T1 (DEST_MIN_SEQ)

DEST_MIN_SEQ is a destination SEQ at which no changes with a source SEQ greater than SRC_PITR_SEQ have been applied at the destination database system. In contrast, DEST_START_SEQ is the destination SEQ earlier than that of any changes lost at the source database system that appear in the redo log of the destination database system. Alternatively, DEST_START_SEQ may be the destination SEQ at which no changes with a source SEQ greater than SRC_PITR_SEQ started to be applied at the destination database system. When the destination SEQs are in the same order as the source SEQs, DEST_MIN_SEQ may be any value (1) equal to or greater than the maximum destination SEQ for which the source SEQ is less than or equal to SRC_PITR_SEQ and (2) less than the minimum destination SEQ for which the source SEQ is greater than SRC_PITR_SEQ. This range of values for DEST_MIN_SEQ may be written as $$\text{MIN}\{\text{DEST\_SEQ}(\text{SRC\_SEQ} > \text{SRC\_PITR\_SEQ})\} > \text{DEST\_MIN\_SEQ} \geq \text{MAX}\{\text{DEST\_SEQ}(\text{SRC\_SEQ} \leq \text{SRC\_PITR\_SEQ})\},$$

where {DEST_SEQ(SRC_SEQ>SRC_PITR_SEQ)} is the set of all DEST_SEQs that map to SRC_SEQs that are greater than SRC_PITR_SEQ, and {DEST_SEQ(SRC_SEQ≦SRC_PITR_SEQ)} is the set of all DEST_SEQs that map to SRC_SEQs that are less than or equal to SRC_PITR_SEQ. When the order of the destination SEQs is not the same as the source SEQs, DEST_MIN_SEQ is chosen to be the highest destination SEQ satisfying the relationship, MIN{DEST_SEQ(SRC_SEQ>SRC_PITR_SEQ)}>DEST_MIN_SEQ, where MIN{DEST_SEQ(SRC_SEQ>SRC_PITR_SEQ)} is the minimum DEST_SEQ of the set of DEST_SEQs that maps to a SRC_SEQ that is greater than SRC_PITR_SEQ. DEST_MIN_SEQ for the out of order case is discussed further later in the specification.

Similarly, DEST_START_SEQ may be chosen to be any of a variety of values. Specifically, DEST_START_SEQ may be any destination SEQ that is less than or equal to the minimum START_SEQ for which the source SEQ is greater than SRC_PITR_SEQ.

DEST_START_SEQ may be earlier or later than DEST_MIN_SEQ. DEST_START_SEQ may be earlier than DEST_MIN_SEQ, because DEST_START_SEQ is based on the SEQs at the start of the application of the changes at the destination database system, while, for example, DEST_MIN_SEQ may be based on the SEQs when changes have already been applied (the SEQs at the times of being committed) at the destination database system. For example, consider a situation in which just after a time, T1=11:00 am, the source system crashes. The source SEQ at 11:00 a.m. may have been S1001, and consequently, SRC_PITR_SEQ=S1001. The SRC_PITR_SEQ=S1001 may map to a DEST_SEQ of D1200, and consequently DEST_MIN_SEQ=D1200. Let us assume that only three changes were applied at the destination database system after DEST_MIN_SEQ, X, Y, and Z, which were applied at DEST_SEQ=D1210, D1215, and D1303, respectively. It is possible that changes X, Y, and Z began to be applied at DEST_SEQs D1201, D1003, and D1301, respectively. In which case, DEST_START_SEQ is D1003, which is earlier than DEST_MIN_SEQ. However, it is also possible that changes X, Y, and Z began to be applied at DEST_SEQs D1201, D1203, and D1301, respectively. In which case, DEST_START_SEQ is D1201, which is later than DEST_MIN_SEQ.

During recovery of data at the source database system, when searching a full mapping table, if changes are applied in order at the destination database system, the source database system should apply changes with destination SEQs that are greater than DEST_MIN_SEQ, and ignore changes with destination SEQs that are less than or equal to DEST_MIN_SEQ. In the above example (TABLE 1), if DEST_MIN_SEQ=D44, then D44 and D30 should be ignored. Similarly, if the changes are applied in order at the destination database system, changes that were applied between DEST_START_SEQ and DEST_MIN_SEQ, in addition to earlier changes, may be ignored. In an embodiment, DEST_MIN_SEQ is chosen so that it is always less than the destination SEQs of all changes with source SEQs greater than SRC_PITR_SEQ.

If changes are committed at the destination database system in the order applied at the source database, DEST_MIN_SEQ is a destination SEQ that is just prior to the first change that was applied at the source database system after SRC_PITR_SEQ (and therefore in the above example, DEST_MIN_SEQ is D44). When changes are committed in order at the destination database system, DEST_MIN_SEQ is sufficient for filtering out the destination SEQs of group changes between DEST_START_SEQ and DEST_MAX_SEQ which have source SEQs less than or equal to SRC_PITR_SEQ, because the ordering of the group destination SEQs ensures that changes with source SEQs less than or equal to SRC_PITR_SEQ must also have group destination SEQs less than or equal to DEST_MIN_SEQ. In other words, to find the lost changes, a search can be performed for changes that have been applied having group destination SEQs that are between DEST_MIN_SEQ (or DEST_START_SEQ if DEST_START_SEQ is greater and more convenient to use) and DEST_MAX_SEQ. The recovered changes can be selectively chosen in that users may choose which changes to apply at the source database system during recovery. However, although a list of the destination SEQs of all groups that have committed is obtained by searching between DEST_MIN_SEQ and DEST_MAX_SEQ, there may be missing individual destination SEQs that belong to one or more of the groups having destination SEQs found.

Consequently, when searching historical records, even if the changes are applied in order, the DEST_START_SEQ is useful for locating the individual changes that were made prior to DEST_MIN_SEQ that are part of a group change that finished being applied after DEST_MIN_SEQ (and therefore have a source SEQ that is greater than SRC_PITR_SEQ). Thus, the historical records would be searched from DEST_START_SEQ to DEST_MAX_SEQ, and those changes having group destination SEQs that are less than or equal to DEST_MIN_SEQ would be filtered out. Alternatively, any change having a source SEQ earlier or equal to SRC_PITR_SEQ would be filtered out.

However, if changes can be applied out of order, then additional information may be useful, because it is possible that some changes having source SEQs that are less than or equal to SRC_PITR_SEQ were applied after DEST_MIN_SEQ, which may need to be ignored during recovery. Out of order point in time recovery is discussed further below.

In Order Full Table (START_SEQ)

In an embodiment, if changes are applied in order at the destination database system, when a change is being applied, it is desirable to record the START_SEQ (the destination SEQ when the destination database system starts applying the change or applies the first change or data piece in a group), and the SRC_SEQ in the mapping table. Thus, each row of the mapping table contains (START_SEQ, SRC_SEQ, DEST_SEQ). In this case, assume that the mapping table contains all records. (It is also possible to periodically purge the table, but then mapping information would be lost for the purged rows. Alternatively, a historical record may be searched for the purged rows.) TABLE 2 is an example of a mapping table that includes the START_SEQ in each row. The column labeled "Starting DEST_SEQ" contains the START_SEQs of TABLE 2. TABLE 3, below, is another example of adding a START_SEQ column to TABLE 1.

TABLE 3

| SRC_SEQ | DEST_SEQ | START_SEQ | Changes |
|---------|----------|-----------|---------|
| S0      | D30      | D10       | I       |
| S1      | D44      | D8        | E       |
| S12     | D45      | D15       | C       |
| S33     | D65      | D35       | D       |
| S41     | D144     | D12       | H       |
| S42     | D148     | D144      | A       |
| S47     | D165     | D49       | B       |

According to the first row of the above mapping table (TABLE 3), the change "I", which was applied at the source database system at the SRC_SEQ S0, began to be applied at the destination database system at DEST_SEQ D10, and was finished being applied at the destination database system at DEST_SEQ D30. TABLE 2 and TABLE 3 are different examples. The two examples differ only in their respective starting destination SEQ values. The column labeled "Starting DEST_SEQ" of TABLE 2 contains the START_SEQ values of the example of TABLE 2, but was not labeled "START_SEQ" only because the quantity "START_SEQ" had not been introduced yet.

Given the SRC_PITR_SEQ, in addition to being able to determine DEST_MIN_SEQ and DEST_MAX_SEQ as described earlier, DEST_START_SEQ may also be determined. In an embodiment, DEST_START_SEQ is the minimum START_SEQ that has a destination SEQ (associated with the change or data piece being applied at the destination) that is greater than DEST_MIN_SEQ. DEST_START_SEQ is the earliest START_SEQ of the data lost at the source database system. Thus, in the above example, the START_SEQs that map to DEST_SEQs that are greater than DEST_MIN_SEQ (D44) are D15, D35, D12, D144, and D49. The minimum of these START_SEQs is D12, and consequently, DEST_START_SEQ is D12 in the above example.

In Order Full Table (MIN_START_SEQ)

The quantity, MIN_START_SEQ may be defined to be the global minimum START_SEQ for all changes (e.g., transactions) currently being applied. In an embodiment, MIN_START_SEQ is the DEST_START_SEQ at the destination SEQ having the value of DEST_MIN_SEQ. Consequently, as an optimization, MIN_START_SEQ may be stored in the mapping table in addition to or instead of START_SEQ. For example, adding a column to the above mapping table including a column for MIN_START_SEQ, the above table becomes

TABLE 4

| SRC_SEQ | DEST_SEQ | START_SEQ | MIN_START_SEQ | Changes |
|---------|----------|-----------|---------------|---------|
| S0      | D30      | D10       | D8            | I       |
| S1      | D44      | D8        | D8            | E       |
| S12     | D45      | D15       | D12           | C       |
| S33     | D65      | D35       | D12           | D       |
| S41     | D144     | D12       | D12           | H       |
| S42     | D148     | D144      | D49           | A       |
| S47     | D165     | D49       | D49           | B       |

The first row, for example, may be derived by observing that shortly before change I commits, changes E, C, H, and I are also being applied, which have START_SEQs of D8, D15, D12, and D10, respectively. The minimum of D8, D15, D12, and D10 is D8, and therefore MIN_START_SEQ at DEST_SEQ D30 is D8.

Whether or not the changes are applied in order, if the mapping table contains MIN_START_SEQ, SRC_SEQ, and DEST_SEQ, then DEST_START_SEQ may be found by determining the value of MIN_START_SEQ for the row having a destination SEQ equal to DEST_MIN_SEQ. In the above example, as determined above DEST_MIN_SEQ (the latest DEST_SEQ with a corresponding SRC_SEQ at or before T1) is D44. The row having DEST_SEQ equal to D44 maps to a MIN_START_SEQ of D8. Consequently, MIN_START_SEQ, in this example, is D8. Thus, by determining the value of DEST_MIN_SEQ, the value of MIN_START_SEQ and therefore DEST_START_SEQ are retrieved, even if in order application is not maintained.

In Order, Flashback (Using MIN_START_SEQ)

If changes are applied in order at the destination database system, if MIN_START_SEQ and the source SEQ are recorded, and if the mapping table has only one row, the historical record for the mapping table may be used to find earlier values. The mapping table contains one row with at least MIN_START_SEQ and the source SEQ. The values for both MIN_START_SEQ and the source SEQ are monotonically increasing, making it possible to search efficiently in the historical record. Given SRC_PITR_SEQ, it is possible to find the DEST_MIN_SEQ by searching the historical record for the mapping table to find the record with the latest destination SEQ for which the corresponding source SEQ is less than or equal to SRC_PITR_SEQ; the value of MIN_START_SEQ of the record is DEST_START_SEQ. Also, DEST_MAX_SEQ may be found by searching the historical record for the mapping table to find the DEST_SEQ at which the current value in the row was updated. The process that mines the redo log and captures the changes can stop once it captures the change where the row in the mapping table is updated to its current value.

In an alternative embodiment, other information about the state of changes at the destination database system at the time the current row is entered into the mapping table (such as whether or not there are changes in progress that have not yet been applied or committed) may be stored in the mapping table or historical record instead of or in addition to using the quantities specified in this specification to infer the same or equivalent information.

Out of Order, Full Table

Consider the following sequence of events involving the source database system and a destination database system from the point of view of the destination database system.

ferent order than the changes begin to be applied. Similarly, by comparing the order of the changes in the "SRC_SEQ of Change Applied" column to the ordering of the DEST_SEQs, it can be seen that the changes were applied at the destination database system in a different order than the changes were applied at the source database system. Although in TABLE 5 each of changes A-F always have different SEQs from one another, changes may be applied in parallel at either or both the destination and source database systems. Consequently, any combination of changes A-F may have the same source SEQ, the same destination SEQ marking the start of applying the change, and/or the same destination SEQ marking the finish of applying the change.

Based on the above sequence of events, the following table may be derived.

TABLE 6

| SRC_SEQ | DEST_SEQ | START_SEQ = DEST_SEQ at Start of Application | MIN_START_SEQ | Change Applied |
|---|---|---|---|---|
| 11 | 12 | 11 | 9 | A |
| 13 | 14 | 9 | 9 | B |
| 19 | 16 | 10 | 10 | E |
| 14 | 17 | 15 | 12 | F |
| 15 | 18 | 13 | 12 | C |
| 17 | 20 | 12 | 12 | D |

TABLE 5

| DEST_SEQ | Last Change that Started Application | SRC_SEQ of Change Started | Last Change Finished Application | SRC_SEQ of Change Applied |
|---|---|---|---|---|
| 9 | B | 13 | | |
| 10 | E | 19 | | |
| 11 | A | 11 | | |
| 12 | D | 17 | A | 11 |
| 13 | C | 15 | A | 11 |
| 14 | C | 15 | B | 13 |
| 15 | F | 14 | B | 13 |
| 16 | | | E | 19 |
| 17 | | | F | 14 |
| 18 | | | C | 15 |
| 19 | | | C | 15 |
| 20 | | | D | 17 |

In TABLE 5, the first column "DEST_SEQ" is the value of SEQ at the destination database system when each event listed occurs. Each row of the second column, "Last Change that Started Application", lists the last one of changes A-F that began being applied. The third column "SRC_SEQ of Change Started" gives the SEQ at the source database system for the change that started to be applied at the destination database system. The fourth column, "Last Change Finished Application" lists changes A-F, in which each row lists the last change that finished being applied. The fifth column "SRC_SEQ of Change Applied" gives the SEQ at the source database system for the change that just finished being applied at the destination database system. As can be seen by comparing the order of the changes in the "SRC_SEQ of Change Started" column and "SRC_SEQ of Change Applied" column, the changes finish being applied in a dif- TABLE 6 is an example of rows of a mapping table based on the above-tabulated events in TABLE 5. As in the in order example discussed above, the above table does not need to include both a column for START_SEQ and MIN_START_SEQ. The last column "Change Applied" is a label for a change that has been applied at the destination database system. The rest of the entries in each row of the table correspond to the applied change listed in the column "Change Applied". The first column SRC_SEQ lists the sequence numbers at the source database system, which have been applied at the destination database system at the DEST_SEQs listed in the column labeled "DEST_SEQ". The next column labeled "START_SEQ=DEST_SEQ at Start of Application" is the START_SEQ, and is found by finding the DEST_SEQ at the start of application of the change at the destination database system.

For example, in the first row, change A, which has SRC_SEQ 11 and was applied at DEST_SEQ 12, as indicated in the fourth row of TABLE 5, began to be applied at DEST_SEQ 11, as indicated in the third row of TABLE 5. Consequently, the first row of the mapping table, TABLE 5, as the value 11 in the START_SEQ column. The column labeled "MIN_START_SEQ" lists the MIN_START_SEQs. For example, at the time that change A was applied, the application of changes B and E already began, at DEST_SEQs 9 and 10, respectively. Additionally, changes B and E had not finished being applied, yet. The minimum starting destination SEQ of the changes that were not finished being applied is 9, and consequently, the entry in the first row of TABLE 6, in the column "MIN_START_SEQ", is 9.

Assume that the source database system had a loss of data, and the last SEQ at the source database system that was not lost was the SRC_SEQ having the value 16. Since the SRC_PITR_SEQ is a SRC_SEQ just prior to the first SRC_

SEQ that was lost, the SRC_SEQ may be chosen to be 16. This is consistent with a loss of data occurring at the source database system at a source SEQ just prior to the source SEC listed in the last row of TABLE 5.

An algorithm for finding DEST_MIN_SEQ, based on TABLE 6, is to first find the minimum destination SEQ having a source SEQ greater than SRC_PITR_SEQ. Thus, since SRC_PITR_SEQ is 16, the only DEST_SEQs having SRC_SEQs that are greater than SRC_PITR_SEQ are the third row, having DEST_SEQ 16, and the last row, having DEST_SEQ 20. The DEST_MIN_SEQ is the latest DEST_SEQ at which no changes having a source SEQ that is greater than SRC_PITR_SEQ have been applied. The only changes having a source SEQ greater than SRC_PITR_SEQ are E and D, which have SRC_SEQs of 17 and 19, respectively. The change with the earliest destination SEQ is E, which has a DEST_SEQ of 16. The DEST_SEQ just prior to 16 is 15, to be ignored, all rows in the mapping table are found that have a value of destination SEQ that is greater than DEST_MIN_SEQ and a value for the source SEQ that is less than or equal to SRC_PITR_SEQ.

Out of Order, Flashback (SRC_HWM)

In out of order flashback, changes can be applied out of order at the destination database system. For this situation it is useful to record the source high water mark. The source high water mark is the current highest SRC_SEQ of changes that have been applied, which may be designated as SRC_HWM. The mapping table at the destination database system may have entries for (MIN_START_SEQ, SRC_HWM). In an embodiment, the table having SRC_HWM may contain one row, which is updated for each change applied by the destination database system. If the above mapping table is modified to include a column for SRC_HWM, the resulting table is

TABLE 7

| SRC_SEQ | DEST_SEQ | START_SEQ = DEST_SEQ at Start | MIN_START_SEQ | SRC_HWM | Change Applied |
|---|---|---|---|---|---|
| 11 | 12 | 11 | 9 | 11 | A |
| 13 | 14 | 9 | 9 | 13 | B |
| 19 | 16 | 10 | 10 | 19 | E |
| 14 | 17 | 15 | 12 | 19 | F |
| 15 | 18 | 13 | 12 | 19 | C |
| 17 | 20 | 12 | 12 | 19 | D | and consequently, DEST_SEQ 15 may be used for the DEST_MIN_SEQ. Alternatively, since in this example only changes after DEST_MIN_SEQ are sent back to the source database system, the destination SEQ of the row entry in the mapping table just prior to the row found, which has a DEST_SEQ of 14, may be used for the DEST_MIN_SEQ. Consequently, the DEST_MIN_SEQ may be 14. This method of finding DEST_MIN_SEQ can also be used for the in order case.

The DEST_START_SEQ may be found by searching TABLE 6 for the DEST_SEQ corresponding to the minimum START_SEQ that maps to a corresponding SRC_SEQ that is greater than SRC_PITR_SEQ. The only rows that have DEST_SEQs greater than 14 and have SRC_SEQs greater than SRC_PITR_SEQ (which is 16) are the rows having DEST_SEQs of 16 and 20, which have SRC_SEQs of 19 and 17 and have START_SEQs of 10 and 12, respectively. The smallest START_SEQ found is 10. Since DEST_START_SEQ is a DEST_SEQ that is just prior to the beginning to the application of changes being applied at the destination database system, the DEST_START_SEQ is 9.

Alternatively, if the MIN_START_SEQ is used to determine DEST_START_SEQ, then DEST_START_SEQ is the value of MIN_START_SEQ for the row used for DEST_MIN_SEQ. The row of TABLE 6 with DEST_SEQ 14 was used to determine DEST_MIN_SEQ, which maps to MIN_START_SEQ 9, and therefore DEST_START_SEQ is 9. In an embodiment, DEST_MAX_SEQ may be found by searching for the maximum destination SEQ in the mapping table, TABLE 6, which in the above example is 20.

For the out of order case, it is possible that some changes that were performed at the source database system before SRC_PITR_SEQ were not applied at the destination until after the DEST_MIN_SEQ. During recovery, these changes may be captured, but must be ignored (and not applied at the source database system). To find the list of changes that need SRC_HWM is used to find an approximate DEST_MIN_SEQ. Each time a change is applied at the destination database system the maximum of the current SRC_SEQ and the prior value for SRC_HWM may be taken and then used as the updated value of SRC_HWM. For example, in the third row of the above table (the row for change E), the current SRC_SEQ is 19, and the prior SRC_HWM was 13. The maximum of 13 and 19 is 19, and therefore, SRC_HWM is updated to 19. In the next row of TABLE 7, the current SRC_SEQ is 14, and the prior SRC_HWM was 19. The maximum of 14 and 19 is 19, and therefore, SRC_HWM is updated to 19.

As an optimization, SRC_HWM can be updated "lazily". The SRC_HWM does not need to be exact, but should be a conservative value for the high water mark. Consequently, the SRC_HWM does not need to be updated every time the actual value changes. Updating the SRC_HWM lazily may result in a conservative SRC_HWM, and may therefore increase the number of records that need to be searched. However, as long as it is expected that there is not an excessive number of extra records that need to be searched, the conservative value of SRC_HWM is adequate. For the in order case, SRC_HWM is the same as the SRC_SEQ.

Using SRC_HWM, an algorithm for finding the DEST_MIN_SEQ is as follows. The historical record for the mapping table or the mapping table (e.g., TABLE 7) is searched to find the latest destination SEQ for which the SRC_HWM is less than or equal to SRC_PITR_SEQ. For example, using 16 for SRC_PITR_SEQ, starting from the bottom of the table the first SRC_HWM that is less than 16 is 13, which maps to DEST_SEQ 14. Consequently, the DEST_MIN_SEQ is 14.

As explained above in the section about DEST_MIN_SEQ, for the out of order case, it is also possible that changes performed earlier than or at the same source SEQ as SRC_PITR_SEQ at the source database system may be applied later than DEST_MIN_SEQ at the destination database system. Thus, some of the changes that are captured (e.g., those captured changes having source SEQs less than or equal to SRC_PITR_SEQ) may need to be filtered out. In the out of order case, it may also be desirable to have a method for determining the list of source SEQs that are less than or equal to SRC_PITR_SEQ that were applied after DEST_START_ SEQ. One method may maintain a table of changes having SRC_SEQs (e.g., TABLEs 4, 6, or 7), or by recording the source SEQs in the redo log.

As in the in order case, to determine which changes between DEST_START_SEQ and DEST_MAX_SEQ have source SEQs less than or equal to SRC_PITR_SEQ (and therefore should not be applied at the source database system), it may be desirable to store a mapping between the source SEQ and destination SEQ at which a change was applied at the destination database system. The SRC_SEQs of the changes that were applied could be stored in the mapping table or in a separate table, and it is possible to search the historical record for the mapping table entries that have changes that have been applied and that have SRC_SEQs that are less than or equal to SRC_PITR_SEQ. This list can be consulted to determine which changes should be applied and should not be applied at the source database system.

In an embodiment, this table may be used during recovery. The capture process may then filter out all changes with source SEQs less than or equal to SRC_PITR_SEQ. This method can also be used for the full table case.

In an embodiment, since a list of changes that need to be ignored is already being constructed, using DEST_MIN_ SEQ is not necessary, and therefore not recorded. The list of changes to ignore can also include those that would be filtered by DEST_MIN_SEQ. DEST_MIN_SEQ may also be eliminated from the full table case in a similar manner.

Similar to the in order flashback case, instead of finding DEST_MAX_SEQ, the process mining the redo log and capturing the changes can stop when it finds the row in the mapping table being updated to its current value or at the last row entered into the table.

An Embodiment of a System that in which Two Database Systems are Synchronized

FIG. 1 is a block diagram of an embodiment of a system 100 in which the invention may be implemented. System 100 includes source database system 102 having database server 104. System 100 also includes network 118 and destination database system 120. Destination database system 120 includes database server 122 having apply and capture processes 124. Additionally destination database system 120 includes database 126, which includes mapping table 128 and historical record 130. In alternative embodiments, system 100 may not have all of the components listed above or may have other components instead of and/or in addition to those listed above.

Source database system 102 may be a machine or network of machines supporting a source database. The source database system 102 sends copies of changes or operations that affect changes to a destination database system. In an embodiment, system 100 may include several source database systems. Source database system 102 may send an identifier, identifying the origin of the information sent, along with the information sent to the destination database system. The identifier may be used to distinguish information associated with source database system 102 from information associated with another source database system.

Database server 104 is software and/or hardware that accesses source database system 102. Queries and other database commands are submitted to database server 104, which processes the commands and returns or manipulates data in the source database in response to the database commands.

Database 108 is the source database that contains data. Database 108 is accessed via database server 104. Copies of operations manipulating the data or of changes to the data in database 108, caused by database server 104, are sent to the destination database system.

Network 118 can be a Local Area Network (LAN), a Wide Area Network (WAN) and/or a direct connection. The copies of the operations performed upon database 108 and/or the changes in data in database 108 are sent by database server 104, via Network 118, to the destination database system.

Destination database system 120 is the destination to which the copies of operations or changes in data are being transported. There may be any number of other destination database systems attached to network 118. One destination database system 120 may receive copies of changes from any number of source database systems 102, and one source database system 102 may send copies of changes to any number of destination database systems 120. Database server 122 is the software and/or hardware that accesses the database of the destination database system. Queries and other database commands are submitted to database server 122, which processes the commands and returns or manipulates data in the destination database in response to receiving the database commands. Database server 122 may have a capture process and apply processes at capture and apply processes 124. The capture portion of capture and apply processes 124 captures the copies of the operations and the changes. The apply portion of capture and apply processes 124 applies the copies of the operations and the changes to the destination database. Although in FIG. 1 capture and apply processes 124 is located at destination database system 120, capture processes and/or apply processes may be located at source database system 102 and/or other computer systems instead of or in addition to the capture process and/or apply process of capture and apply processes 124.

Database 126 is the destination database at which the copies of operations and changes of data are applied. Database 126 includes a mapping table 128, which stores a mapping between sequence information associated with source database system 102 and destination database system 120. Mapping table 128 may be one or more mapping tables, which may be any of the tables discussed above (e.g., any of TABLES 1-7). Additional tables may be included that facilitate the speed and/or ease of access of information in mapping table 128. Mapping table 128 is not limited to any of the precise formats shown above, but may have any of a variety of other formats. For example, no matter which of the one or more tables are used for mapping table 128, mapping table 128 may not have all of the columns discussed above, or may include other columns in addition to or instead of columns discussed above.

Optionally, database 126 may contain historical records, which may be used to supplement mapping table 128. Specifically, mapping table 128 may contain one row, and capture and apply processes 124 may capture the mapping information from historical records 130. In an embodiment in which historical records 130 are not kept, capture and apply processes 124 may not include a capture process or a portion for performing capture operations associated with capturing information from the historical records.

Destination database system 120 may be a backup or logical standby for source database system 102. Optionally, database server 104 may also include capture and apply process, a mapping table, and/or historical records that allow the roles of source database system 102 and destination database system 120 to be reversed.

Alternative Embodiments

In the above description, a variety of quantities were defined (e.g., START_SEQ, DEST_MAX_SEQ, DEST_MIN_SEQ, MIN_START_SEQ, SRC_PITR_SEQ, SRC_HWM), and may be chosen to be any of a range of values. Each of these quantities may be used to demark the beginning or the end of a range of SEQs that are of interest or that need to be discarded. DEST_MIN_SEQ may be used to demark the end of one set of SEQs (DEST_START_SEQ to DEST_MIN_SEQ) and the beginning of another set of SEQs (DEST_MIN_SEQ to DEST_MAX_SEQ). If a particular quantity is used to demark the smallest SEQ of the range, depending on whether the particular quantity is an SEQ that is the first of the range or is an SEQ that is prior to the range, the algorithms associated with that quantity operate on (e.g., search, minimize, or maximize) SEQs that are greater than or equal to that quantity or operate on SEQs that are greater than that quantity, respectfully. However, a different embodiment may be obtained by replacing a quantity that is the first of the range for a quantity that is prior to and close to the beginning of the range and by changing the algorithm from performing operations on values that are greater than or equal to the particular quantity to performing operations on values that are greater than the particular quantity. Also, a different embodiment may be obtained by replacing a quantity that is prior to and used to mark the beginning of the range for one that is the first of the range and by changing the algorithm from performing operations on values that are greater than the particular quantity to performing operations on values that are greater than or equal to the particular quantity.

Similarly, if a particular quantity is used to demark the last SEQ of the range, depending on whether the particular quantity is an SEQ that is the last SEQ of the range or is an SEQ that is after the range, the algorithms associated with that quantity operate on SEQs that are less than or equal to or SEQs that are less than that quantity, respectfully. A different embodiment may be obtained by replacing a quantity that is the last of the range for one that is relatively soon after the range and by changing the algorithm from performing operations on values that are less than or equal to the particular quantity to performing operations on values that are less than the particular quantity. Also, a different embodiment may be obtained by replacing a quantity that is after and used to mark the last of the range for one that is the last of the range and by changing the algorithm from performing operations on values that are less than the particular quantity to operations on values that are less than or equal to the particular quantity.

In the above description it is assumed that lower SEQs correspond to earlier times. However, any of the above embodiments may be transformed to a different embodiment by using a set of SEQs in which smaller SEQs correspond to later times. For example, the SEQs may be negative numbers that monotonically decrease in value. When using a set of SEQs that decrease in value, the corresponding algorithms may be obtained from the above described algorithms by substituting each "greater than" with a "less than" and each "less than" with a "greater than". Although the above description refers to a source database system and destination database system, any source system may be substituted for the source database system, and/or any destination system may be substituted for the destination database system.

Hardware Overview

Figure 2:
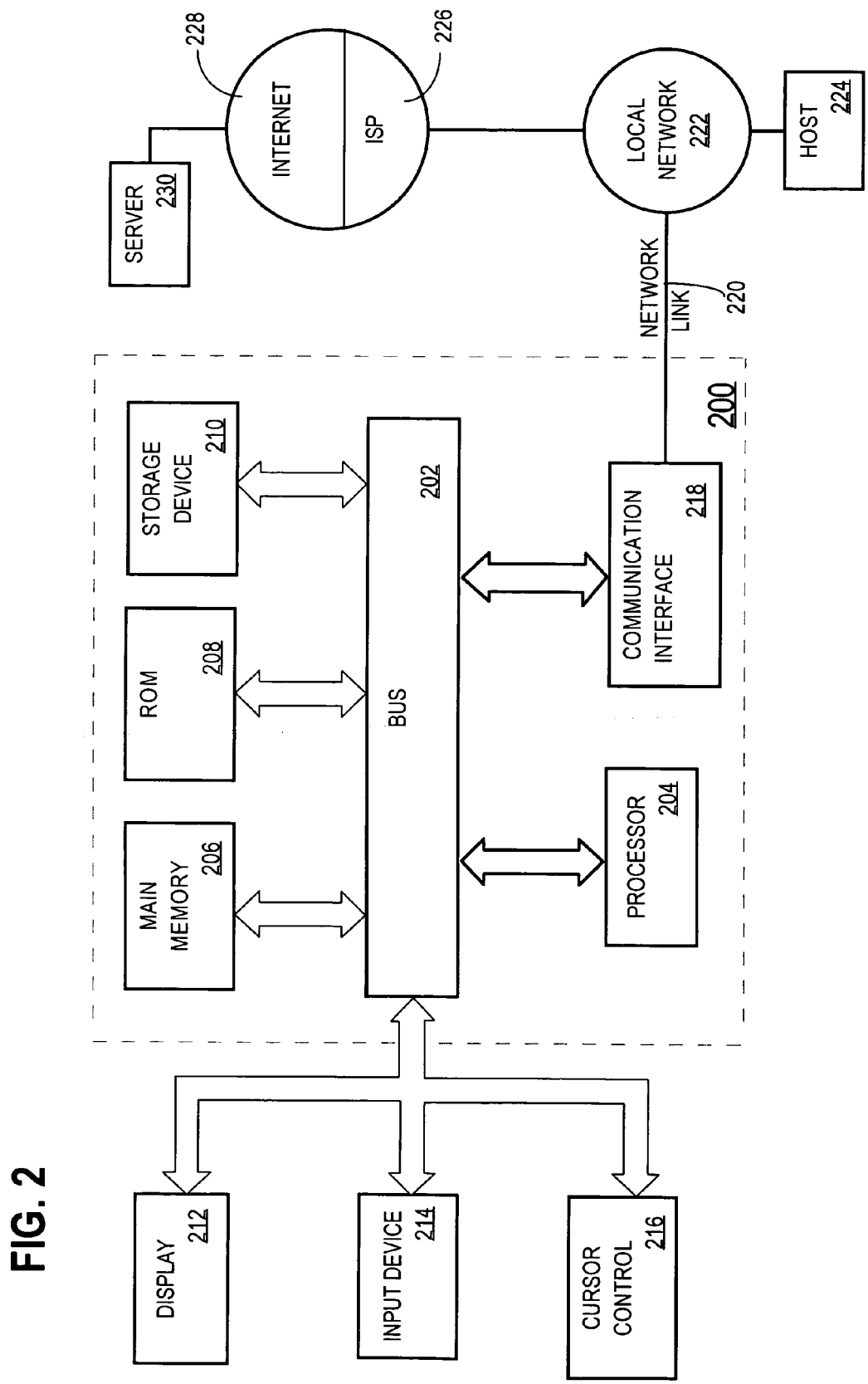
FIG. 2 is a block diagram that illustrates a computer system that may be used in implementing an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of a computer system 200 for either or both of source database system 102 and destination database system 120. According to one embodiment of the invention, synchronizing sequence information is provided by computer system, such as computer system 200, in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for synchronizing the sequence information of two computer systems as described herein.

The received code may be executed by processor 204 as it is received, and/or stored in storage device 210, or other non-volatile storage for later execution. In this manner, computer system 200 may obtain application code in the form of a carrier wave. Computer system 200 is just one example of a machine that may be used in implementing an embodiment of the invention, and the computer readable medium described above is one example of a machine-readable medium that may be used in a machine used in implementing an embodiment of the invention.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A computer implemented method comprising:
   a first computer system that manages a first database applying, to the first database, sets of one or more changes that were previously applied by a second computer system to a second database, the second database being managed by the second computer system;
   wherein each set of said sets of one or more changes is assigned, by the first computer system, a particular value from a first set of ordered sequence values generated by the first computer system and assigned, by the second computer system, a particular value from a second set of ordered sequence values generated by the second computer system;
   wherein the first set of ordered values indicates an order that said first computer system applied said sets of one or more changes to the first database;
   wherein the second set of ordered values indicates an order that said sets of one or more changes were applied by said second computer system to the second database;
   wherein the particular value from the first set of ordered values that corresponds to a set of one or more changes is different from the particular value from the second set of ordered values that corresponds to the set of one or more changes;
   generating, at the first computer system, correlation data, for each set of said sets of one or more changes, that indicates a correlation between the particular value from the first set of ordered values that corresponds to the set of one or more changes and the particular value from the second set of ordered values that corresponds to the set of one or more changes; and
   identifying, based on the correlation data and a particular value from said second set of values that is associated with a state of the second database, a first value associated with a state of the first database system that correspond to said state of the second database system.

2. The method of claim 1, further comprising receiving at the first computer system from the second computer system a request for a portion of the sets of one or more changes.

3. The method of claim 1, wherein the step of identifying is performed in response to said first database system receiving a query whose results are to be computed based on the state of the second database system.

4. The method of claim 3, further comprising:
   determining a flashback value from the first set of values that corresponds to a flashback value from the second set of values by at least searching a historical record associated with the first computer system for a maximum value of the second set that is less than or equal to the flashback value of the second set, and finding a corresponding value of the first set that maps to the maximum value found, wherein the corresponding value of the first set is the flashback value of the first set; and computing results of the query based on a change applied at the first computer system at the flashback value of the first set, and therein computing results of the query based on the state of the second database system at the flashback value at the second database system.

5. The method of claim 1, further comprising capturing at least a portion of the correlation data from historical records associated with the first computer system, the historical records storing data that reflects changes made to the first database.

6. The method of claim 1, wherein the correlation data is stored in a mapping table mapping the first set of values to the second set of values.

7. The method of claim 6, wherein the mapping table includes only one row.

8. The method of claim 1, wherein the correlation data further comprises information associated with a start of applying a set of one or more changes at the first computer system.

9. The method of claim 1, further comprising determining a value from the first set of values associated with an earliest value, from the second set, that data was lost at the second computer system.

10. The method of claim 1, further comprising determining a value from the second set of values associated with an earliest value, from the second set, that data was lost at the second computer system.

11. The method of claim 1, further comprising determining a start value from the first set of values associated with a start of application of a set of one or more changes at the first computer system wherein the start value is associated with an earliest value in the first set that corresponds to lost data at the second computer system.

12. The method of claim 1, wherein at least a portion of the correlation data is stored in a mapping table, and the first computer system is associated with a historical record that reflects changes made to the first database; and the method further comprises:

determining an approximation of a desired value from the first set based on the mapping table mapping; and determining more a precise value for the desired value from the historical record.

13. The method of claim 1, further comprising determining from the correlation data a maximum value of the first set of values at which a search, at the first computer system, for changes applied at the second computer system may be terminated.

14. The method of claim 1, further comprising:

determining a DEST_MIN value of the first set of values by at least finding a maximum value of the first set of values that maps to a value of the second set of values that is less than or equal to a first value associated with the second set of values at which a change was applied at the second computer system that is being recovered.

15. The method of claim 14, wherein each of the first set of values is a group value and each of the one or more changes of associated is associated with an individual value, and the method further comprises:

determining a DEST_START value that is a first individual value associated with a group value, wherein the determining is performed by at least finding a minimum first individual value associated with a particular group value, wherein the first individual value is associated with a time at which a first change associated with the group value was made, and wherein the group value has a value that is greater than the DEST_MIN value.

16. The method of claim 1, wherein each of the first set of values is a group value and each of the one or more changes of associated is associated with an individual value, and the method further comprises:

determining a MIN_START value that is a first individual value associated with a group value, wherein the determining is performed by at least finding a minimum first individual value associated with a particular group value, wherein the first individual value is associated with a time at which a first change associated with the group value was made, and wherein the group value has a value that is greater than a current group value of a current set.

17. The method of claim 16, further comprising:

determining a DEST_MIN value of the first set of values by at least finding a maximum value of the first set of values that maps to a value of the second set of values that is less than or equal to a first value associated with the second set of values at which a change was applied at the second computer system that is being recovered; and determining a DEST_START value as a value of MIN_START when the current group value is the DEST_MIN value.

18. The method of claim 1, further comprising:

determining, at the first computer system, a high water mark value of the second set by taking a maximum of a current value of the second set and a previous value of the high water mark value;

determining an approximate DEST_MIN value by finding a value of the first set that maps to the high water mark value of the second set, wherein the DEST_MIN value is a value of the first set that corresponds to a first value of the second set for which a change is being recovered.

19. A computer-readable storage medium storing instructions which, when executed by one or more processors, cause the one or more processors to perform the steps recited in claim 1.

20. A computer-readable storage medium storing instructions which, when executed by one or more processors, cause the one or more processors to perform the steps recited in claim 2.

21. A computer-readable storage medium storing instructions which, when executed by one or more processors, cause the one or more processors to perform the steps recited in claim 3.

22. A computer-readable storage medium storing instructions which, when executed by one or more processors, cause the one or more processors to perform the steps recited in claim 4.

23. A computer-readable storage medium storing instructions which, when executed by one or more processors, cause the one or more processors to perform the steps recited in claim 5.

24. A computer-readable storage medium storing instructions which, when executed by one or more processors, cause the one or more processors to perform the steps recited in claim 6.

25. A computer-readable storage medium storing instructions which, when executed by one or more processors, cause the one or more processors to perform the steps recited in claim 7.

26. A computer-readable storage medium storing instructions which, when executed by one or more processors, cause the one or more processors to perform the steps recited in claim 8.

27. A computer-readable storage medium storing instructions which, when executed by one or more processors, cause the one or more processors to perform the steps recited in claim 9.

28. A computer-readable storage medium storing instructions which, when executed by one or more processors, cause the one or more processors to perform the steps recited in claim 10.

29. A computer-readable storage medium storing instructions which, when executed by one or more processors, cause the one or more processors to perform the steps recited in claim 11.

30. A computer-readable storage medium storing instructions which, when executed by one or more processors, cause the one or more processors to perform the steps recited in claim 12.

31. A computer-readable storage medium storing instructions which, when executed by one or more processors, cause the one or more processors to perform the steps recited in claim 13.

32. A computer-readable storage medium storing instructions which, when executed by one or more processors, cause the one or more processors to perform the steps recited in claim 14.

33. A computer-readable storage medium storing instructions which, when executed by one or more processors, cause the one or more processors to perform the steps recited in claim 15.

34. A computer-readable storage medium storing instructions which, when executed by one or more processors, cause the one or more processors to perform the steps recited in claim 16.

35. A computer-readable storage medium storing instructions which, when executed by one or more processors, cause the one or more processors to perform the steps recited in claim 17.

36. A computer-readable storage medium storing instructions which, when executed by one or more processors, cause the one or more processors to perform the steps recited in claim 18.

* * * * *

UNITED STATES PATENT AND TRADEMARK OFFICE
CERTIFICATE OF CORRECTION

| | |
|---|---|
| PATENT NO. | : 7,523,143 B2 |
| APPLICATION NO. | : 10/909985 |
| DATED | : April 21, 2009 |
| INVENTOR(S) | : Wong et al. |

Page 1 of 1

It is certified that error appears in the above-identified patent and that said Letters Patent is hereby corrected as shown below:

In column 2, line 1, before "DESCRIPTION" insert -- BRIEF --.

In column 14, line 54, delete "as" and insert -- has --, therefor.

Signed and Sealed this

Fifteenth Day of June, 2010

David J. Kappos
*Director of the United States Patent and Trademark Office*